(12) United States Patent
Frink (10) Patent No.: US 6,854,427 B2
(45) Date of Patent: *Feb. 15, 2005

(54) URINE COLLECTION DEVICE WITH A DETACHABLE HEAD PART

(75) Inventor: Martin Frink, Wedemark (DE)

(73) Assignee: Solvay Pharmaceuticals GmbH, Hannover (DE)

(*) Notice: Subject to any disclaimer, the term of this patent is extended or adjusted under 35 U.S.C. 154(b) by 0 days.

This patent is subject to a terminal disclaimer.

(21) Appl. No.: 10/453,888

(22) Filed: Jun. 4, 2003

(65) Prior Publication Data

US 2004/0035372 A1 Feb. 26, 2004

Related U.S. Application Data

(63) Continuation of application No. PCT/EP01/13963, filed on Nov. 29, 2001.

(30) Foreign Application Priority Data

Dec. 4, 2000 (DE) .......................... 100 60 318

(51) Int. Cl.$^7$ ............................................. A01K 23/00
(52) U.S. Cl. ...................................... 119/869; 604/327
(58) Field of Search ................................ 119/868, 869, 119/867; 54/79.2; 604/327

(56) References Cited

U.S. PATENT DOCUMENTS

| 2,519,743 | A | * | 8/1950 | Cruise ........................ 119/869 |
| 3,036,533 | A | * | 5/1962 | Burt et al. .................... 426/294 |
| 3,036,553 | A | | 5/1962 | Gandier et al. |
| 3,270,714 | A | * | 9/1966 | Gandier ....................... 119/867 |
| 3,850,159 | A | * | 11/1974 | Langley ....................... 600/580 |
| 4,886,508 | A | * | 12/1989 | Washington ................. 604/327 |
| 5,735,835 | A | * | 4/1998 | Holland ....................... 604/331 |

FOREIGN PATENT DOCUMENTS

| WO | WO 99/57969 | 11/1989 |
| WO | WO 95/13695 | 5/1995 |
| WO | WO 97/21343 | 6/1997 |
| WO | WO 00/60928 | 10/2000 |
| WO | 00/72667 | 12/2000 |
| WO | WO 01/19282 | 3/2001 |
| WO | WO 01/33951 | 5/2001 |
| WO | WO 02/28172 | 4/2002 |

* cited by examiner

Primary Examiner—Michael J. Carone
Assistant Examiner—Susan C. Alimenti
(74) Attorney, Agent, or Firm—Crowell & Moring LLP (57) ABSTRACT

A urine collecting device for horses, especially mares, suitable for attachment to a special holding harness and a special head part therefor, which is advantageously suitable for collecting pregnant mares' urine for obtaining natural mixtures of conjugated estrogens. The holding harness with urine collecting device according to the invention offers high flexibility and wearing comfort for the horse. The horse's freedom of movement is not substantially impaired by the holding harness with urine collecting device, so grazing is possible, and it is not necessary to tether the horse in a narrow stall. The urine collecting device of the invention is distinguished in particular in that the urine collecting part and the head part are joined via a detachable connection, such as a bayonet lock.

3 Claims, 6 Drawing Sheets

URINE COLLECTION DEVICE WITH A DETACHABLE HEAD PART

CROSS REFERENCE TO RELATED APPLICATIONS

This application is a continuation of international patent application no. PCT/EP01/13963, filed Nov. 29, 2001, designating the United States of America, and published in German as WO 02/45488, the entire disclosure of which is incorporated herein by reference. Priority is claimed based on Federal Republic of Germany patent application no. DE 100 60 318.1, filed Dec. 4, 2000.

BACKGROUND OF THE INVENTION

The present invention relates to a holding harness with a urine collecting device for horses, with a head part which is detachable from the collecting pouch. The holding harness with urine collecting device according to the invention is intended in particular for obtaining a natural mixture of conjugated estrogens from the urine of pregnant mares.

Estrogens are used in medicine for hormone replacement therapy. In particular, estrogen mixtures are used for the treatment and prophylaxis of the disorders of the climacteric period which occur in women after natural or artificial menopause. In this case, natural mixtures of conjugated estrogens (CO) such as are found in the urine of pregnant mares (PMU=pregnant mares' urine) have proved particularly effective and readily compatible.

The collection of the urine is therefore a significant partial step in obtaining hormone, and requires suitable devices which permit the urine to be collected in a practicable manner which is compatible with the animal. In particular, the device should be easy to wear and be compatible with the normal behaviour and requirements of mobility and rest of the horse. Furthermore, the device should however also permit flexible (easy attachment and removal or replacement) collection of the urine which is effected as purely as possible (no faeces) and in a manner protecting the hormone.

The harness should be readily adaptable to the individual dimensions of the horse and fix the urine collecting device sufficiently in the desired position on the horse. Once the urine collecting device has been attached, if at all possible no readjustment, or only infrequent to occasional readjustment, should be necessary, and—while also allowing the horse as great a freedom of movement as possible—urine collection which is as loss-free as possible should be ensured. A holding harness of this type with urine collecting device has already been described in international patent application PCT/EP 00/04872 dated May 29, 2000. The urine collecting device itself should furthermore be comfortable to handle and be able to be kept hygienically clean.

SUMMARY OF THE INVENTION

It was therefore an object to provide an interchangeable urine collecting device for horses.

Another object of the invention was to provide a urine collecting device for horses which can be fastened flexibly to a special holding harness.

A further object of the invention was to provide a urine collecting device for horses which meets stringent requirements in relation to practical usability on an industrial scale.

It was also an object of the invention to provide a urine collecting device for horses which facilitates comfort of wearing for the horses.

Yet another object of the invention was to provide a urine collecting device for horses which can be handled comfortably and can be easily kept hygienically clean.

These and other objects are achieved by the invention as described and claimed hereinafter. The objects are in particular achieved by the urine collecting device (mare urinal) described herein, and furthermore by the combination of the mare urinal with a special holding harness for attaching the mare urinal to the horse, and also a particular configuration of the head part of this mare urinal, which are described hereinafter.

The features of the holding harness and urine collecting device of the present invention largely correspond to those features of the holding harness with urine collecting device in accordance with international patent application PCT/EP 00/04872, but in a departure therefrom in the present invention the collecting pouch and the head part of the urine collecting device are connected detachably together.

The invention therefore proposes a holding harness with a urine collecting device for horses, in particular mares, which is characterized by the elements arranged as follows:

A) a basic harness consisting of straps, comprising:
   a girth (1) passing around the horse and extending on both sides from the back to the lower breast, to which girth in each case at least two conventional fastening elements (1a) of adjustable length are attached in the lateral upper part at some distance from each other;
   a breast strap (2) extending around the front breast (shoulder) approximately horizontally on both sides of the horse in each case as far as the girth;
   a lower breast strap (3) extending from the shoulder, through between the front legs to the girth;
   a withers strap (4) extending from the withers on both sides of the horse to the breast strap;
   a crupper (5) of adjustable length, extending from the withers strap along the spinal column over the back, loins and croup of the horse to the tail head, with a tail loop (5a) surrounding the tail head;
   on either side of the horse one side strap (6) extending from the withers strap approximately at the height of the start of the shoulder approximately horizontally as far as the girth; the individual straps of the basic harness being equipped with conventional elements for adjusting the strap lengths and being joined together in a manner conventional for horse harnesses, if necessary in completely or partially detachable manner; and B) a large-mesh net (7) covering approximately the loin and croup region and descending laterally to at most approximately the lower rump line, which net is held by the fastening elements (1a) of adjustable length located on the upper part of the girth, and on which furthermore C) a urine collecting device is suspended detachably but in a position-fixing manner, this urine collecting device in turn comprising:
   an elongate collecting pouch (8) which can be suspended in an approximately horizontal position beneath the belly of the horse;
   a middle section (9) which tapers in a funnel shape, adjoining the collecting pouch in the region of the rear legs of the horse, which section is passed through between the rear legs and merges into a tubular connecting piece (9a) with an approximately vertical arrangement towards the rear part of the horse, and the collecting pouch (8), middle section (9) and connecting piece (9a) together forming the so-called collecting part (8-9a);

a head part (10), with a urine collecting shell (10b) adapted to the vulva of the horse and lying largely tightly thereagainst, the tubular neck (10a) of the head part (10) being connected to the connecting piece (9a) via a detachable connection (15) (adapter); and for fastening the urine collecting device to a holding harness, at least several flaps (11a) and (11b) provided with one or more eyelets, a) the flaps (11a) being arranged on both sides in the lateral, upper region of the collecting pouch (8), and b) the flaps (11b) being arranged to the rear side of the urine collecting shell (10b) on both sides in the upper region of the head part (10).

The individual details of the invention will be described further below and will additionally be explained with reference to FIGS. 1 to 6.

In its central aspect, the invention thus relates to a urine collecting device for mares (mare urinal), which is distinguished by the following features:

an elongate collecting pouch (8) which can be suspended in an approximately horizontal position beneath the belly of the horse;

a middle section (9) which tapers in a funnel shape, adjoining the collecting pouch in the region of the rear legs of the horse, which section is passed through between the rear legs and merges into a tubular connecting piece (9a) with an approximately vertical arrangement towards the rear part of the horse, and the collecting pouch (8), middle section (9) and connecting piece (9a) together forming the so-called collecting part (8-9a);

a head part (10), with a urine collecting shell (10b) adapted to the vulva of the horse and lying largely tightly thereagainst, the tubular neck (10a) of the head part (10) being connected to the connecting piece (9a) via a detachable connection (15) (adapter); and for fastening the urine collecting device to a holding harness, at least several flaps (11a) and (11b) provided with one or more eyelets, a) the flaps (11a) being arranged on both sides in the lateral, upper region of the collecting pouch (8), and b) the flaps (11b) being arranged to the rear side of the urine collecting shell (10b) on both sides in the upper region of the head part (10).

The urine collecting device of the present invention thus comprises two individual elements joined detachably together, which comprise on the one hand a collecting pouch (8) including the middle section (9) and connecting piece (9a), which together form the collecting part (8–9a), and on the other hand the head part (10). These individual elements of the urine collecting device may be made from any urine-resistant materials compatible with the horse, such as latex, silicone or the like, and may be manufactured by a processing method conventional for these materials, (e.g. by a dipping process or injection moulding process). It is then optionally also possible to combine different materials together. If desired, therefore, for example fabrics which are coated with the above materials or alternatively with rubber or polyurethane materials etc., such as are used for coating rainwear and tarpaulins, may serve as a base. Many types of materials made of natural or synthetic fibers may be used as fabrics, e.g. cotton fabric, nylon fabric or the like. The components of the urinal which are securely connected together may in this case be glued or bonded.

If desired, the respective separate individual elements of the urinal, i.e. the collecting part (8–9a) or the head part (10), after being assembled from the associated individually manufactured parts, may be coated in their entirety (using conventional process techniques, e.g. a dipping process or an injection moulding process) with an additional protective latex or silicone layer of desired thickness. Hitherto, in particular latex (commercially available types) or rubberised fabric, but for individual parts also silicone, have proved suitable as materials. Latex or silicone is preferably used here e.g. for manufacturing the head part (10) and latex or rubberised fabric in particular for manufacturing the collecting part, in particular the collecting pouch (8) and optionally middle section (9).

The urine collecting device should be sufficiently robust for the intended purpose, yet somewhat flexible, in order thus equally to ensure both durability and comfort of wear. Owing to the overall flexible configuration of the mare urinal, it may be advantageous to provide those regions which are subject to particular stress during use or require better dimensional stabilisation with stiffening or reinforcement.

According to the invention, the collecting part (8–9a) and head part (10) are joined together via a detachable connection (15), e.g. an adapter. The detachable connection (15) or the adapter makes it possible, once the urine collecting device has been used, to detach the collecting part (8–9a) from the head part. The detachable connection or the connecting element (15) may in this case be in the form of an adapter consisting of two parts, one part (15a) being securely or detachably connected to the connecting piece (9a) and the other part (15b) likewise being securely or detachably connected to the neck (10a) of the head part (10).

The detachable connection between the two individual parts (15a) and (15b) of the connecting element (15) may in this case be produced e.g. by screwing (thread), insertion (clips) or the combination of insertion with lateral turning and suitable locking (bayonet lock). A simple bayonet lock is preferred, but in principle other connection methods can also be used which make it possible to detach or join again the individual parts (15a) and (15b) of the connecting element comfortably and quickly. Preferably in this case the part (15b) located on the head part engages in the part (15a) of the connecting element.

The respective individual part (15a) or (15b) of the connecting element is connected either securely or optionally also detachably to the connecting piece (9a) of the collecting part (8–9a) or to the neck (10a) of the head part (10). A fixed connection of the individual parts (15a) or (15b) with the connecting piece (9a) or with the neck (10a) may—depending on the material of the connecting element (15)—be produced e.g. by gluing or bonding regions of the connecting piece (9a) or neck (10a) located projecting on the respective part of the connecting element.

Detachable connections of the individual parts (15a) or (15b) with the connecting piece (9a) or neck (10a) may be produced by fixing regions of the connecting piece (9a) or neck (10a) located projecting on the respective part of the connecting element by means of cable binders, hose clamps or similar fixing means. In the case of detachable connections of the individual connecting element parts with the connecting piece (9a) or the neck (10a), the individual parts (15a) or (15b) in a preferred embodiment have a ring groove which serves to fix in tension-resistant manner regions of the connecting piece (9a) or neck (10a) located projecting on the respective part of the connecting element, in that due to the contact pressure it can receive entirely or in part the zone of the projecting region of connecting piece (9a) or neck (10a) which is located at this point and also the fixing means used for tying.

Synthetic resin (i.e., plastic) material and lightweight metals or metal alloys, e.g. aluminium or aluminium alloys, are suitable materials for manufacturing the connecting element (15). If desired, that part (15b) of the connecting element (15) which is connected with the neck (10a) of the head part (10) may also be equipped with an easy-action non-return valve, which stops any already-collected urine from flowing back out of the collecting pouch (8) into the head part (10) e.g. when the horse is lying down.

The construction of the urine collecting device in two parts from a collecting part (8–9a) and a head part (10) which can be detachably connected via the connecting element (15) has a number of additional advantages compared with a one-part urine collecting device with a fixed connection of the collecting part (8–9a) and head part (10). In particular, a better urine quality can be achieved, since both the collecting part (8–9a) and head part (10) can be cleaned more comfortably and better from the inside, even using brushes, after use.

Furthermore, the connecting element (15) can be constructed such that a thin internal plastic bag can be additionally drawn into the collecting part (8–9a). This offers a further advantage in terms of hygiene, since after each emptying of the collecting pouch (8) a new, unused internal plastic bag can be drawn into the collecting part. The opening of the inserted internal plastic bag in this case is folded over outwards on the connecting-element part (15a) and subsequently held by inserting the two parts (15a) and (15b) into one another.

The use of such an internal plastic bag makes it substantially easier to keep the collecting part (8–9a) clean, since formation of quantities of residual urine, which can always represent an undesirable germ cell for secondary infestation with bacteria, in the collecting pouch (8) can be prevented effectively. Overall, therefore, the invention ensures a better quality of the collected urine, since the better hygiene possibilities mean that (re-)contamination with residual bacteria in the collecting pouch (8) can be avoided.

The suspension flaps with eyelets for fastening the urine collecting device to the net (7) may be of any design, provided that they fulfil their purpose. Thus, for example, the flaps attached laterally in the region of the collecting pouch may be individual flaps each with only one eyelet or alternatively combined wing flaps having a plurality of eyelets. Useful examples include individual or wing flaps (11a) having 1 to 5, in particular wing flaps having 2 to 3, eyelets.

Figure 5A:
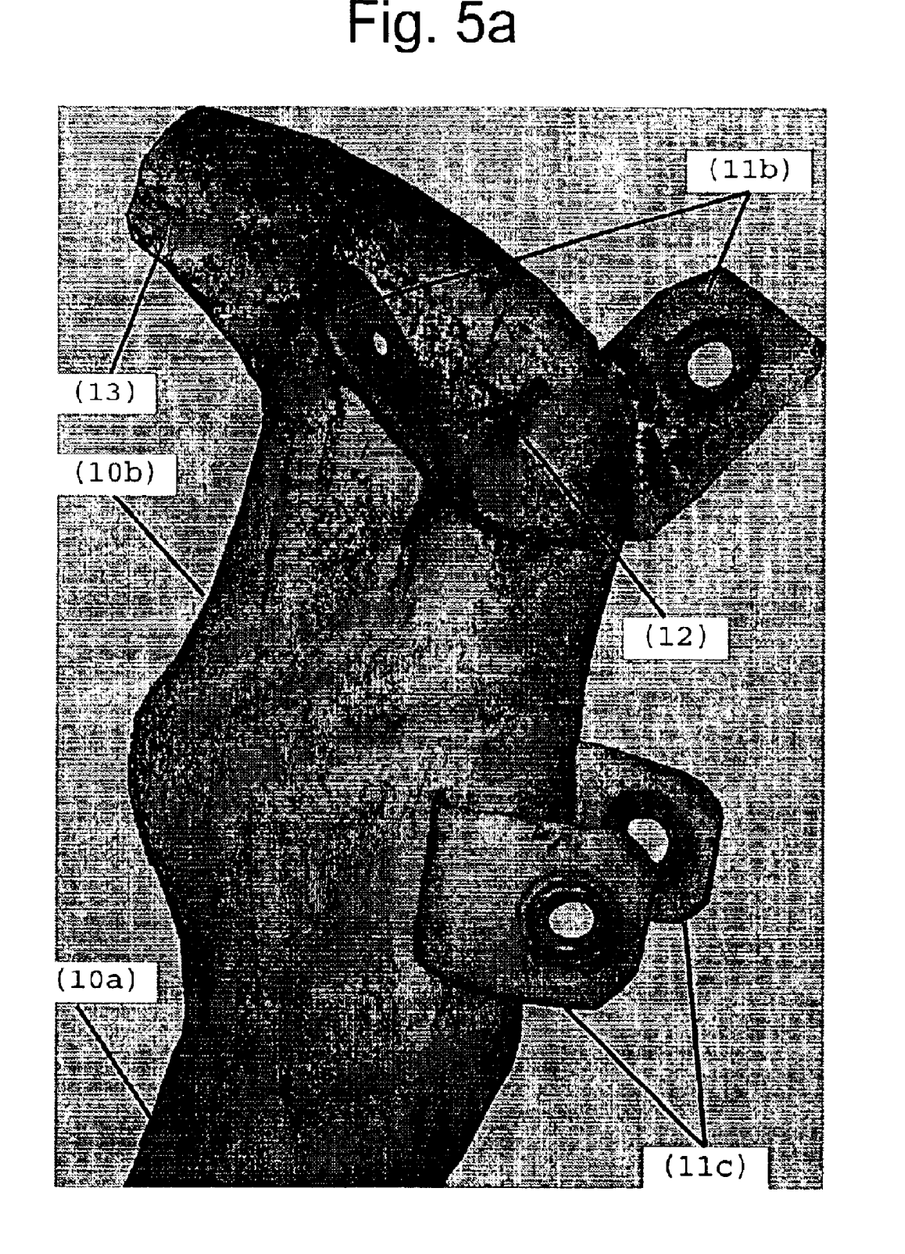
FIGS. 5*a* and 5*b* are rear views of the head part.
Figure 5B:
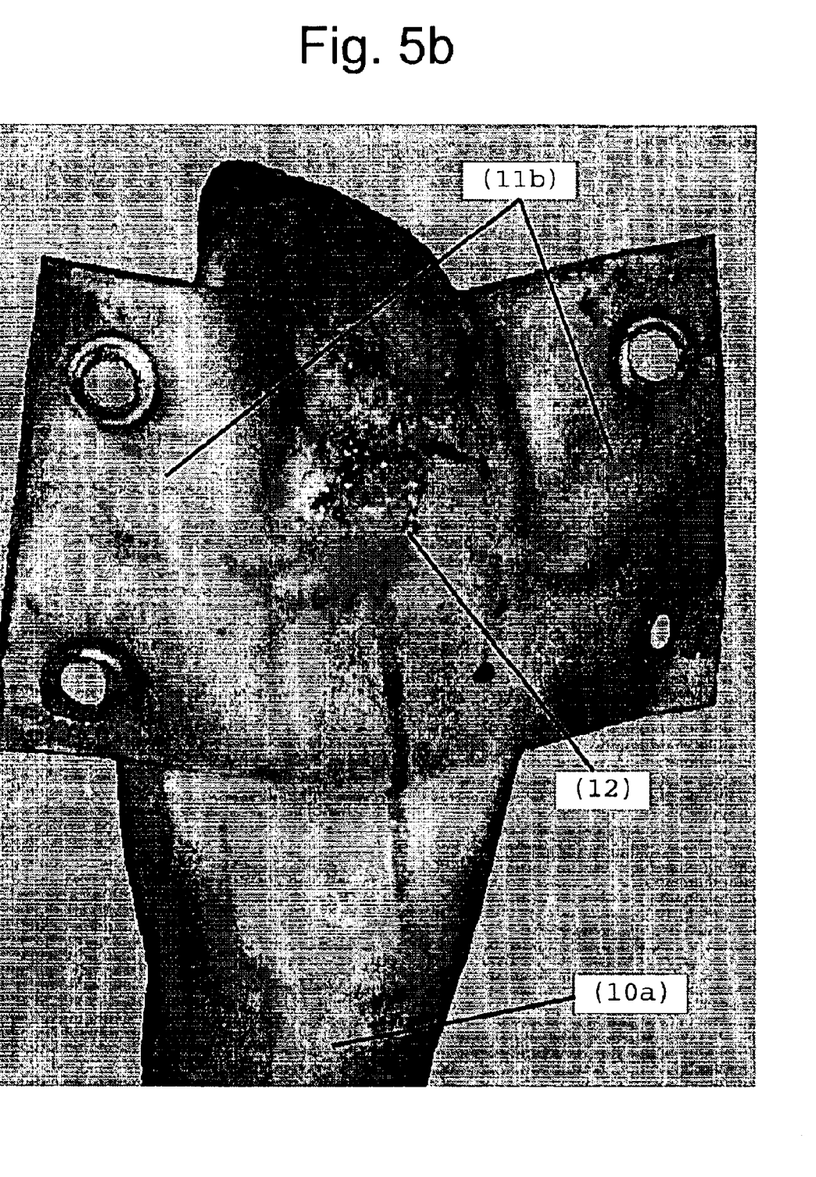

The flaps (11b) on the head (10) of the urinal may likewise be in the form of small wing flaps with 2 to 3 eyelets instead of individual flaps with only 1 eyelet each, as shown e.g. in FIG. 5b. If desired, the mare urinal may have additional flaps (11c) in the middle rear region of the head part (10), as shown in FIG. 5a; these flaps (11c) are however purely optional and may also be omitted, as shown e.g. in FIG. 6b.

The urine collecting device may be fastened via the flaps to the net of the holding harness in many different ways, e.g. by means of cords, expanders, belts or the like. In particular fastening by expanders has proved expedient for practical use. Commercially available expanders with hooks may be used; however, expanders or rubber cables with carbine hooks which lie flat, e.g. made of plastics material, are more advantageous owing to the lesser risk of injury to the horse.

An example of a configuration of the mare urinal will be described further below using the following dimensions, the amounts given being understood to be an order of magnitude which can be fully varied by the person skilled in the art and adapted to individual circumstances and requirements, e.g. the type of horse, in each case.

The length of the collecting pouch (8), including the horizontal portion of the middle section (9) and connecting-element part (15a), will be in the range from 40 to 55 cm, with a cross-sectional diameter of about 12 to 20 cm, in particular about 15 cm. The height of the middle section (9), from the lower edge of the collecting pouch to the upper edge of the connecting element part (15a), is advantageously about 30 to 35 cm, with a cross-sectional diameter in the region of the connecting piece (9a) of about 6 to 8 cm. The connecting element (15) may have a height of about 7 to 10 cm and a cross-sectional diameter of about 6 to 8 cm. The head part (10) adjoining the middle section (9) will advantageously have a height (measured vertically from the neck opening to the upper edge) of about 30 to 35 cm, plus the height of the free connecting-element part (15b). Further details and dimensions of the head part will be described separately further below.

The dimensions of the wing flaps (11a) are in horizontal length for 3 eyelets about 15 to 20 cm and for 4 eyelets about 20 to 30 cm, and in height a total of about 13 to 15 cm in each case, with a free eyelet area i.e. the area not connected to the collecting pouch (8) by gluing or bonding—which protrudes from the collecting pouch (8), of about 6 cm in height. Individual flaps on the head part (10) as a rule have a free, protruding eyelet area of about 6×6 cm±1 cm. Small wing flaps having, for example, 2 eyelets will have a width of about 8 to 10 cm and a height likewise of about 6 cm±1 cm.

Particularly advantageous are medium-large wing flaps (11b) on the head part (10), as shown in FIG. 5b. If the head part (10) is viewed from behind, it can be seen that the wing flaps (11b) of this variant of the invention form, so to speak, a rectangle applied to the head part (10), with horizontal dimensions of about 20 to 22 cm and vertical dimensions of about 12 to 14 cm, the eyelets being formed in the four corners of this rectangle. This configuration of the flaps (11b) contributes advantageously to the stability of the head part, in particular in use in relation to robustness but also in relation to fixing in position. The head part is thus provided with more stability from behind and the flaps cannot tear out so quickly.

In addition to rectangular forms, other geometric shapes can also be considered for the flaps, in particular in order also to optimize the fixing in position of the urine collecting device by the geometry of the flaps. For example, the wing flaps (11a) may also be approximately V-shaped, e.g. by having a free region tapering towards the middle section (9).

The wall thickness of the urine collecting device is in the millimeter range when e.g. latex or rubberized fabrics are used, but may be up to about 10 to 15 mm in the case of silicone. The wall thickness may be adapted according to the degree of desired flexibility or rigidity in an individual case, the flaps needing to be made somewhat stronger than the other parts of the urinal owing to the increased stress.

In a further aspect of its configuration, the present invention proposes a head part (10) for a urine collecting device (mare urinal) which has the following features:
- a urine collecting shell (10b) located in the upper region, which extends in an S-shape on the inside when viewed from the side, which is adapted to the vulva of the horse and lies largely tightly thereagainst, and wherein the urine collecting shell when viewed from the inner side is in the form of an oval to egg-shaped crown (10d) surrounding the urine entry opening (10c); and
- a tubular neck (10a) with connecting-element part (15a) located in the lower region of the head part, which serves to connect the head part (10) detachably to the inlet connecting piece of a urine collecting pouch via its counterpart, the connecting-element part (15b) located on the entry connecting piece of a urine collecting pouch.

For optimum collection of the urine which is as loss-free as possible, the shape of the head part (10) of the urine collecting device is designed in a special manner in that it has a urine collecting shell (10b) which is adapted geometrically to the anatomy of the horse's vulva and lies substantially tightly thereagainst. The urine collecting shell closes off the upper part of the head part (10) and extends approximately in an S-shape on the inside directed towards the vulva when viewed from the side. The urine collecting shell when viewed from the inner side is in the form of an oval or egg-shaped to droplet-shaped crown (10c) surrounding the urine entry opening.

The urine collecting shell is preferably made from the same flexible materials as the other parts of the urine collecting device, e.g. latex, silicone or the like. The head part is likewise made to be completely flexible, but it may be advantageous, for better dimensional stabilisation during use or to improve the durability, to reinforce the rearward upper region of the head part—i.e. in the region in which the flaps (11b) start or optionally including the region of a few centimeters thereover and/or thereunder—or optionally to provide it with flexible stiffening elements.

These reinforcement elements or stiffening elements may be connected to the flaps (11b) and matched to the material thickness thereof. Such a reinforcement element (12) is shown, for example, for individual flaps in FIG. 5a with a width corresponding to the rearward head part width of about 6 to 7 cm and a height of about 8 cm. A preferred configuration of a head part (10) with a stiffening element combined with two-eyelet wing flaps (11b) on either side can be seen e.g. in FIG. 5b and has already been described further above with examples of dimensions.

The geometric dimensions of the collecting shell will as a rule lie within the range below, it being understood that the dimensions given below are variable and are only intended as a guide by way of example for the individual configuration and adaptation in a concrete application, e.g. to the respective type of horse. For a normal horse ("normal type") the dimensions are as a rule:
  a) Dimensions of the urine entry opening (10c): longitudinal axis (vertical) about 9 to 13 cm; transverse axis, lower region measured about 2 cm above the lower inner edge about 4 to 7 cm, upper region measured about 2 cm below the upper inner edge about 2 to 4 cm.
  b) crown (10d): longitudinal axis (vertical) about 12 to 18 cm, transverse axis, lower region (measured as for urine collecting opening) about 7 to 12 cm, upper region (measured as for urine collecting opening) about 5 to 9 cm; crown thickness about 1.5 to 2.5 cm.

In the case of cold-blooded animals ("cold-blooded type"), the urine entry opening is regularly larger than what was described previously for the normal type. Thus the dimension of the urine entry opening in the cold-blooded type in the longitudinal axis (vertical) will have dimensions of about 13 to 20 cm, the other measurements corresponding to the measurements given for the normal type under a) and b).

Figure 2:
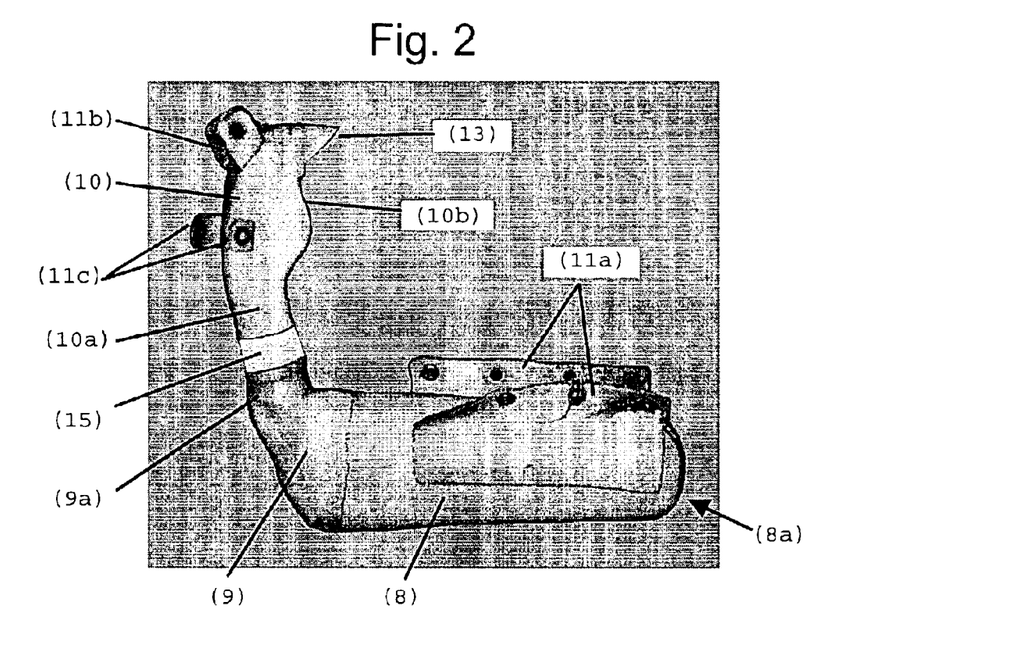
FIG. 2 is a side view of the urine collecting device according to the invention.

When the head part is viewed laterally (see e.g. FIG. 2), the lateral vertical extent of the outer arc of the S-shaped head part at the level of the lower end of the urine collecting shell (10b)—i.e. at about the height of the flaps (11c) in FIG. 2—is about 10 to 15 cm; the corresponding laterally vertical extent of the overlying inner arc of the S-shaped head part is about 7 to 12 cm.

The urine collecting shell may, if desired, also have a notch (perineal notch) in the upper crown region, which lies between the vulva and anus virtually as a tab over the perineum and advantageously supports the orientation and average fixing in position of the urine collecting shell over the vulva. If, therefore, the urine collecting shell has possibly been displaced from its original position due to the mare occasionally lying down, it will readily move back into the correct position upon standing up due to the movement of the animal.

Furthermore, in particular with the "normal type" it may be advantageous to provide a thin, very flexible canopy (13), made for example of latex or silicone, as a faeces deflector and to deflect any small quantities of liquid flowing out after defecation on the head part (10) on the horse side above the urine collecting shell. The canopy (13) is however purely optional and the function according to the invention of the head part (10) is also already optimally ensured in every respect without such a canopy when used. As a rule, the canopy will therefore not be necessary either for the normal type or for the cold-blooded type, and horses of the Haflinger type can regularly manage completely without a canopy. However, a canopy may prove advantageous for certain races of horse, types or in particular mares which have already foaled fairly frequently.

If the head part if desired is provided with a canopy (13), even small dimensions are enough, which for adaptation to the animal lie in about the range of 4×4 to 6×6 cm; in this case, about 2 to 3 cm lie glued or bonded against the head part and the remaining maximum of 2 to 3 cm (or after adaptation shortened even further to 1 to 2 cm) project to the side of the urine collecting shell as the actual canopy. Maximum dimensions of this canopy, for adaptation to the animal, lie in about the range of at most 8×8 to 10×10 cm, with about 4 to 5 cm then lying glued or bonded against the head part and the remaining 4 to 5 cm projecting to the side of the urine collecting shell as the actual canopy.

In the case of production of a head part with canopy, care should be taken that the canopy should first have an excess length of a few centimeters (for example about 2 to 5 cm), in order to permit comfortable individual adaptation of the canopy length to the respective animal simply by cutting to size and optionally by rounding off corners. This canopy which serves as a faeces deflector prevents undesirable contamination of the urine by faeces effectively in the above cases as well for optional use of this canopy and ensures a good quality and purity of the collected urine.

In particular a holding harness which has already been described in international patent application PCT/EP 00/04872 and has the following features is suitable for fastening the urine collecting device according to the invention to horses:
  A) a basic harness consisting of straps, comprising:
    a girth (1) passing around the horse and extending on both sides from the back to the lower breast, to which girth in each case at least two conventional fastening elements (1a) of adjustable length are attached in the lateral upper part at some distance from each other;
    a breast strap (2) extending around the front breast (shoulder) approximately horizontally on both sides of the horse in each case as far as the girth;
    a lower breast strap (3) extending from the shoulder, through between the front legs to the girth;
    a withers strap (4) extending from the withers on both sides of the horse to the breast strap;
    a crupper (5) of adjustable length, extending from the withers strap along the spinal column over the back, loins and croup of the horse to the tail head, with a tail loop (5a) surrounding the tail head;

on either side of the horse one side strap (6) extending from the withers strap approximately at the height of the start of the shoulder approximately horizontally as far as the girth; the individual straps of the basic harness being equipped with conventional elements for adjusting the strap length and being joined together in a manner conventional for horse harnesses, if necessary in completely or partially detachable manner; and B) a large-mesh net (7) covering approximately the loin and croup region and descending laterally to at most approximately the lower rump line, which net is held by the fastening elements of adjustable length located on the upper part of the girth, and which serves for the position-fixing, yet detachable suspension of a urine collecting device which can be worn beneath the horse's belly.

In one variant of the holding harness, the withers strap (4) may optionally divide in a Y-shape into two partial belts towards the breast strap on either side of the horse starting approximately at the level of the start of the shoulder. In this way, if desired, the stability and the seat of the holding harness on the horse can be additionally positively influenced.

The horse harness A) may be a conventional horse harness which has been adapted by hand or by machine manufacture to the intended purpose of the present invention. The individual straps of the holding harness may be made of conventional materials, such as leather or other materials, which are also usually used for the production of bridles and harnesses for horses. In this case, composite structures may also be considered, e.g. reinforcement elements applied to leather at regions of increased stress on the material. Flexible plastic strips or fabrics or alternatively firefighting hose fabric may be used as materials for such reinforcement elements.

The individual straps and other elements of the horse harness A) may be joined together in a manner conventional for horse harnesses. Secure joints of the straps may be obtained by seams or rivets. The horse harness A) should however permit a certain amount of flexibility with regard to the individual adaptation to the proportions of the respective horse. If, therefore, the individual straps are not from the outset joined detachably together in the respective connection regions via connecting elements of adjustable length, such as conventional strap buckles, quick-action belts or other variable rapid-closure means, but are sewn or riveted together, i.e. are securely joined together, the straps should themselves be equipped at a different point with corresponding, conventional elements for setting and adjusting the strap lengths, such as the aforementioned strap buckles, quick-action belts or other conventional elements for varying length.

In order to permit the attachment of the harness in a simple manner by pulling over the horse's head, the girth advantageously is undone in the region of the belly and connected detachably to the lower breast strap.

In order to protect individual parts of the horse's body, the harness A) may furthermore have padding of different thicknesses, depending on the part of the body. Padding may be desirable in particular for the front breast region, withers and back, but possibly also additionally on the side breast wall of the horse. Conventional materials may be used for the padding; for example, felted material of different thicknesses is suitable.

One particular element B) of the holding harness for suspending or fastening a urine collecting device according to the invention to horses is the large-mesh net (7). The use of a net in the context of the holding harness has, for example, the advantage that it offers a plurality of possible methods of fastening any type of urine collecting device and thus these collecting devices can be fixed to and adjusted on the horse in an ideal manner with great flexibility. This net is therefore very advantageous for optimum suspension and fixing of urine collecting devices according to the invention in particular for mares, since in this case, as low-loss collection of the mare's urine as possible can only be ensured if the urine collecting device is permanently and perfectly fixed and adjusted.

Using the net for suspending urine collecting devices and the possibilities for fixing and adjusting these urine collecting devices which this yields means that a significant improvement in urine collection is achieved. Furthermore, the net—in contrast, for example, to a horse blanket—largely prevents any sweating by the horse. There is then no fear of adversely affecting the obtention of estrogen by hormone loss due to secretion of sweat when using the net for fastening urine collecting containers according to the invention.

The lateral ends of the net may hang down at most as far as the lower rump line. In another illustrative embodiment it is sufficient if the lateral ends of the net hang down as far as about the level of the breast strap (2). The ends of the net hanging down may if desired be additionally held by one or more loosely attached belts which pass from one side to the other beneath the horse.

The large-mesh net may be made of any materials compatible with the horse, such as in particular nylon, but possibly also synthetic fibers, leather or hemp. The strength of the net fabric should be sufficient to withstand even long-term stress in practice. The net edges in advantageous, preferred embodiments of the net will be made reinforced. Furthermore, it is recommended, for example to heat-treat the net at the edges, in order to prevent the risk of fraying by slightly melting the nylon fibers.

The following particulars of the dimensions of the net are intended to illustrate the configuration thereof only by way of example. It goes without saying that the person skilled in the art can vary these dimensions at will and adapt them to individual circumstances, requirements or other boundary conditions when carrying out the present invention at a given location. The mesh size of the net may generally be of the order of about 30 to 60 mm. A mesh size of about 45 mm has proved particularly advantageous. The cross-sectional diameter (thickness) of the net cords will be approximately in the range from 3 to 8 mm, in particular about 5 mm.

The holding harness with net (7) can be used universally, and owing to its design can be handled easily. Urine collecting devices can be suspended therefrom flexibly and with good fixing in position. The attachment or removal of the harness can be carried out rapidly with fluent movements once basic adjustment has been performed, so that there is scarcely any fear of unsettling the horse by undesirable hectic handling and the resulting dangers. The attachment or removal of the holding harness can therefore be effected in 2 to 3 minutes, and as a rule merely the belly buckles of the girth and lower breast strap located between the front legs need to be opened.

The holding harness can be worn long-term both with and without a urine collecting device. Thus, for example, 24-hour urine collection is possible, provided that the urine collecting device is appropriately looked after and kept clean, the urine collecting device being readily removable from the horse or exchangeable for emptying and cleaning, which takes place at least twice a day. In this case, it has proved very advantageous, in particular when carrying out intermediate emptyings of the urine collecting device, that— owing to the detachable connection of the head part (10) and collecting part (8–9*a*)—if desired only the collecting part (8–9*a*) needs to be removed from the horse, whereas the head part (10) can remain on the horse.

For reasons of hygiene, it is furthermore advantageous that in particular upon each intermediate emptying operation a new internal plastic bag can be drawn into the collecting part (8–9*a*) and thus intermediate cleaning of the collecting part (8–9*a*) is not necessary. Furthermore, the present invention permits easier individual adaptation of the head part (10) to the respective horse, since optionally only the head part, but not the entire urine collecting device, has to be taken off the horse when exchanging.

Due to the holding harness, the horse can move freely even with the urine collecting device. As a result of the high flexibility and freedom of movement of which the horse is assured, when using the holding harness with or without urine collecting device according to the invention it is not necessary to tether the horse in a narrow stall. The horse can therefore graze at any time, even with an attached urine collecting device. Likewise, foals can suckle independently at any time without problems even on mares with an attached urine collecting device; see e.g. FIG. 6*b*.

The urine collecting device is very robust, owing to the selected materials and design, and can be used both in hot and in cold zones of the world. The holding harness with the urine collecting device according to the invention can therefore be adjusted very flexibly to the local conditions of the horse farm at which urine is to be collected. For example, if necessary the entire holding harness and the urine collecting device can be removed easily and rapidly and then reattached, or the holding harness can be left on the horse for a relatively long time and if necessary only the urine collecting device, or e.g. briefly for emptying, even only the collecting part (8–9*a*), can be removed.

For example, the holding harness with or without net can remain on the horse, in particular during the day for grazing, if provision is made for only night-time collection of urine; however, the entire holding harness with urine collecting device—as already explained above with appropriate care and regular emptying—can also remain complete on the horse for a relatively long time, without restricting its freedom of movement or the possibility of grazing or suckling by foals.

BRIEF DESCRIPTION OF THE DRAWINGS

The invention will be described in further detail hereinafter with reference to illustrative preferred embodiments shown in the accompanying drawings, in which.

DETAILED DESCRIPTION OF PREFERRED EMBODIMENTS

Figure 1:
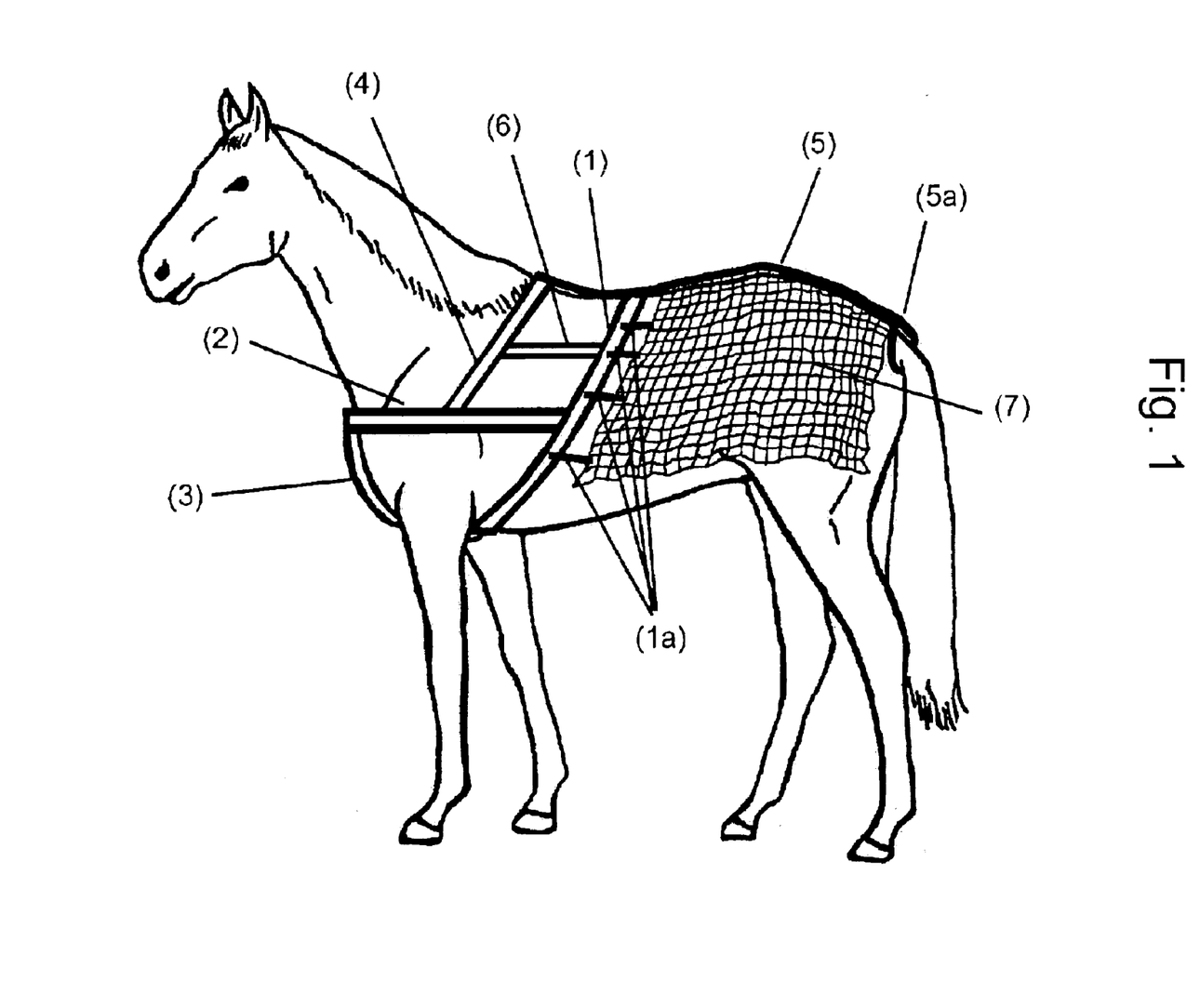
FIG. 1 is a diagram of a holding harness according to the invention for attaching a urine collecting device to a horse.

FIG. 1 is a diagram of a holding harness according to the invention for attaching a urine collecting device to the horse including girth (1); adjustable length fastening elements (1*a*); breast strap (2); lower breast strap (3); withers strap (4); crupper (5) with tail loop (5*a*); side strap (6); and net (7).

FIG. 2 is a side view of the urine collecting device with side view of the head part (10) showing urine collecting pouch (8) with possible position of a urine discharge tube (8*a*); middle section (9) with tubular connecting piece (9*a*); head part (10) with neck (10*a*); urine collecting shell (10*b*); flaps (11*a*) in the form of wing flaps each with 4 eyelets (instead of 3 eyelets in the preferred embodiment); individual flaps (11*b*); optional individual flaps (11*c*), which may optionally be displaced upwards towards the flaps (11*b*) and may be fused therewith to form small wing flaps each with 2 eyelets; canopy (13) as faeces deflector and anal liquid deflector; and detachable connecting element (15), e.g. bayonet lock.

Figure 3:
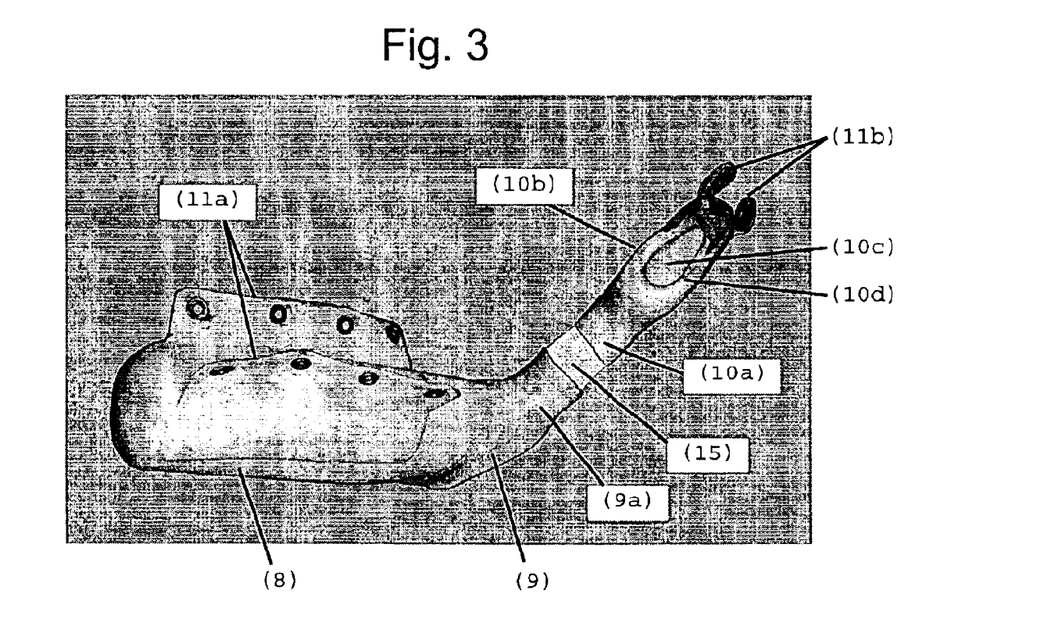
FIG. 3 is a side view of the urine collecting device with an inside view of the urine collecting shell.

FIG. 3 is a side view of the urine collecting device with inner side view of the urine collecting shell (10*b*) showing [For (8) to (10*a*) and (11*a*) to (11*b*) and (15), see explanations for FIG. 2] urine collecting shell (10*b*) with urine entry opening (10*c*); and crown (10*d*) of the urine collecting shell.

Figure 4:
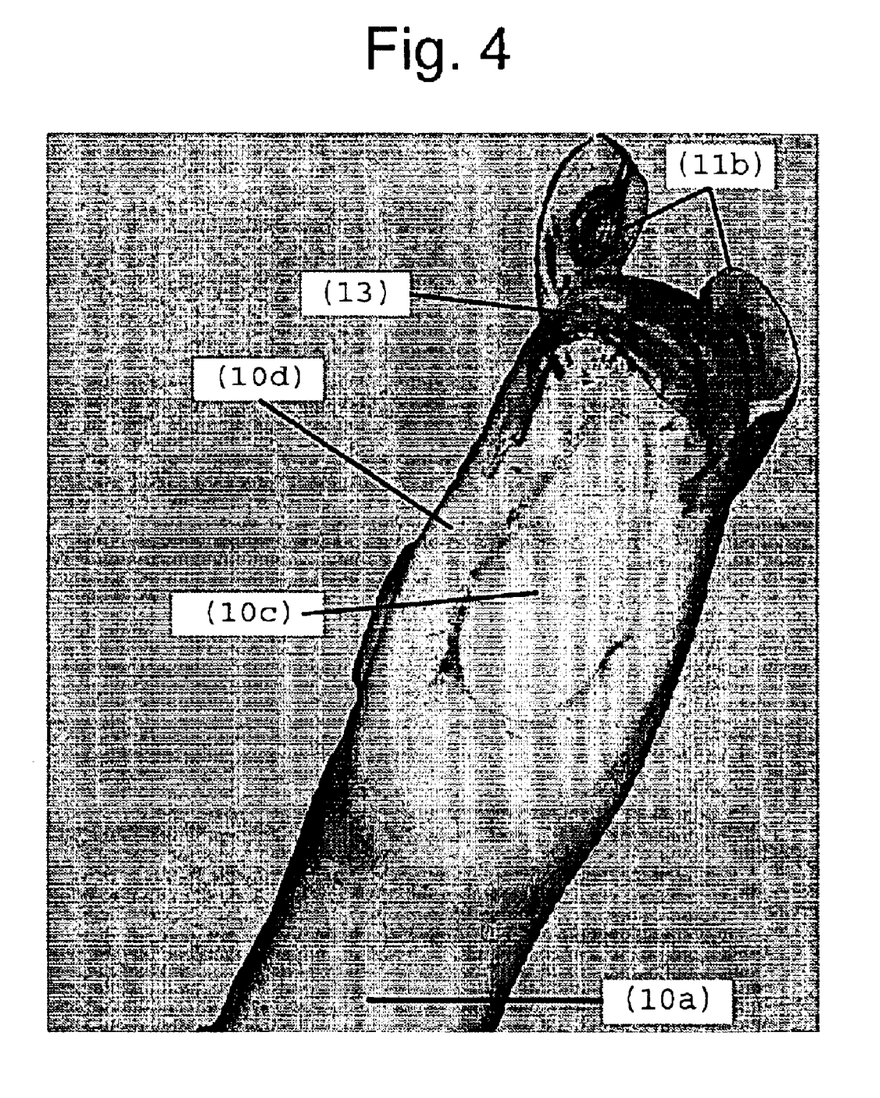
FIG. 4 is an enlarged inside view of the urine collecting shell.

FIG. 4 is an enlarged inside view of the urine collecting shell (10*b*) showing [For (10*a*) to (11*b*) and (15), see explanations for FIG. 3] canopy (13) as a faeces deflector and anal liquid deflector.

FIG. 5*a* is a rear view of the head part (10) of the urine collecting device with individual flaps showing neck (10*a*) of the head part position of the urine collecting shell (10*b*); individual flaps (11*b*); optional individual flaps (11*c*), which may optionally be displaced upwards towards the flaps (11*b*) and fused therewith to form small wing flaps each with 2 eyelets; reinforcements (12) in the head region, optionally fused with the flaps (11*b*); canopy (13) as faeces deflector and anal liquid deflector; and detachable connecting element (15), e.g. bayonet lock.

FIG. 5*b* is a rear view of a preferred head part (10) of the urine collecting device with two-eyelet wing flaps on both sides showing neck (10*a*) of the head part; wing flaps (11*b*); combined with reinforcements (12) in the head region, i.e. here optionally fused with the flaps (11*b*); and detachable connecting element (15), e.g. bayonet lock.

Figure 6A:
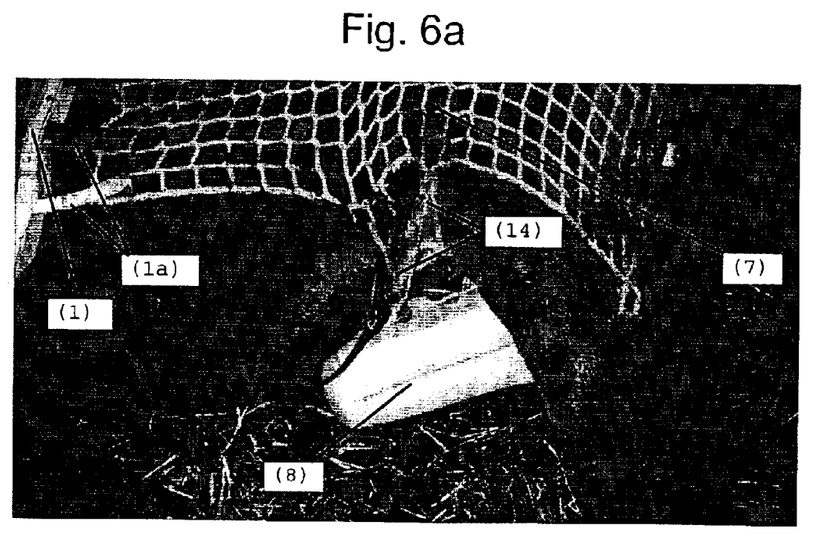
FIG. 6*a* is a side view of a urine collecting device fastened to a horse.

FIG. 6*a* is a side view of a urine collecting device fastened to the horse showing girth (1) with adjustable length fastening elements (1*a*) for the net (7); urine collecting device with visible urine collecting pouch (8); and expander (14).

Figure 6B:
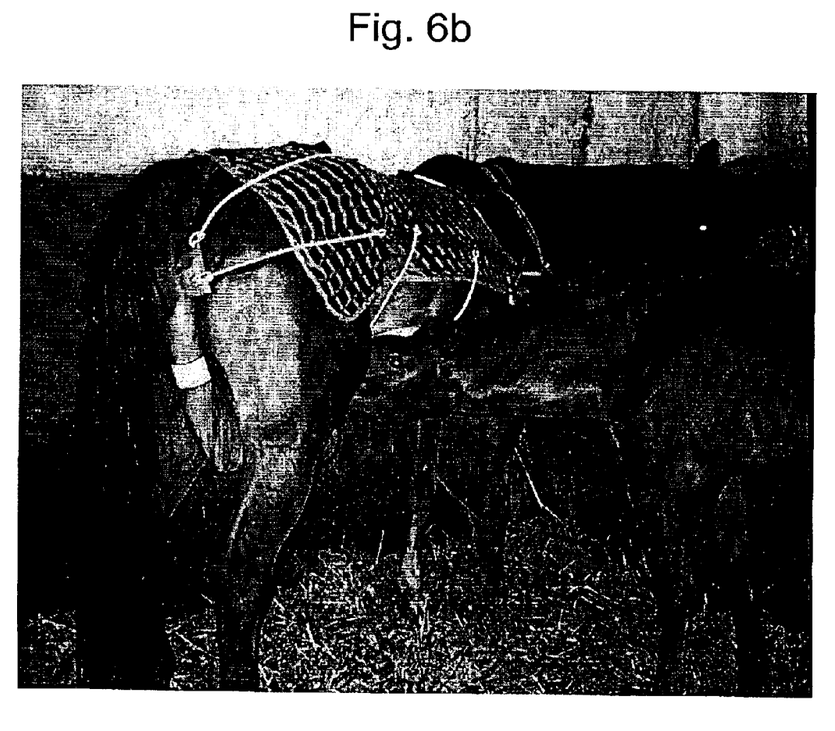
FIG. 6*b* is a view of a urine collecting device with a head part as in FIG. 5*b*.

FIG. 6*b* is a view of a urine collecting device with a head part as in FIG. 5*b*, which is fastened to the horse and is in use, and a suckling foal.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A holding harness with a urine collecting device for mares, comprising:

A) a basic harness of straps comprising:

a girth passing around the horse and extending on both sides from the back to the lower breast, to which girth at least two adjustable length fastening elements are attached in a lateral upper part spaced a distance from each other;

a breast strap extending around the front breast approximately horizontally on both sides of the mare to the girth;

a lower breast strap extending from the shoulder between the front legs to the girth;

a withers strap extending from the withers on both sides of the mare to the breast strap;

an adjustable length crupper extending from the withers strap along the spinal column over the back, loins and croup of the mare to the tail head, and having a tail loop surrounding the tail head;

a side strap on either side of the mare extending from the withers strap approximately at the height of the start of the shoulder approximately horizontally to the girth;

wherein the individual straps of the harness are equipped with elements for adjusting the strap lengths and are joined together in a manner conventional for horse harnesses, optionally in a completely or partially detachable manner;

B) a mesh net covering approximately the loin and croup region and descending laterally to about the lower rump line, which net is held by the adjustable length fastening elements located on the upper part of the girth; and C) a urine collecting device suspended detachably on said net in a position-fixing manner, said urine collecting device comprising:

an elongate collecting pouch which can be suspended in an approximately horizontal position beneath the belly of the mare;

a middle section which tapers in a funnel shape, adjoining the collecting pouch in the vicinity of the rear legs of the mare, said middle section passing between the rear legs and merging into a tubular connecting piece with an approximately vertical arrangement towards the rear part of the mare; whereby said collecting pouch, middle section and connecting piece together form a urine collecting part;

a head part with a urine collecting shell adapted to the vulva of the mare and lying largely tightly thereagainst, said head part having a tubular neck connected to said connecting piece via a detachable connection or adapter; and a plurality of flaps each provided with at least one eyelet for fastening the urine collecting device to a holding harness, wherein a) the flaps are arranged on both sides in the lateral, upper region of the collecting pouch, and b) the flaps are arranged toward a rear of the urine collecting shell on both sides in the upper region of the head part.

2. A urine collecting device for mares comprising:

an elongate collecting pouch which can be suspended in an approximately horizontal position beneath the belly of the mare;

a middle section which tapers in a funnel shape, adjoining the collecting pouch in the region of the rear legs of the mare, said middle section passing between the rear legs and merging into a tubular connecting piece with an approximately vertical arrangement towards the rear part of the mare; whereby the collecting pouch, middle section and connecting piece together form a urine collecting part;

a head part with a urine collecting shell adapted to the vulva of the mare and lying substantially tightly thereagainst, said head part having a tubular neck connected to said connecting piece via a detachable connection or adapter; and a plurality of flaps each having at least one eyelet for fastening the urine collecting device to a holding harness, wherein a) the flaps are arranged on both sides in the lateral, upper region of the collecting pouch, and b) the flaps are arranged toward the rear of the urine collecting shell on both sides in the upper region of the head part.

3. A head part for a urine collecting device comprising:

a urine collecting shell located in an upper region of the head part, which extends in an S-shape inside the shell and is directed toward the vulva of a horse when viewed from the side, and which shell is adapted to the vulva of the horse and lies substantially tightly thereagainst; wherein said urine collecting shell when viewed from inside has the form of an oval to egg-shaped crown surrounding a urine entry opening; and a tubular neck with a connecting-element part located in a lower region of the head part; said neck serving to connect the head part detachably to an inlet connecting piece of a urine collecting pouch via a counterpart connecting-element on the inlet connecting piece of the urine collecting pouch.

* * * * *